US007574389B2

(12) United States Patent
Anuszewski et al.

(10) Patent No.: US 7,574,389 B2
(45) Date of Patent: Aug. 11, 2009

(54) METHOD AND SYSTEM FOR TRANSFERRING MONEY IN BUSINESS-TO-BUSINESS INTERNET TRANSACTIONS

(75) Inventors: William E. Anuszewski, Franktown, CO (US); Portillo C. Humberto, Upper Saddle River, NJ (US)

(73) Assignee: The Western Union Company, Englewood, CO (US)

(*) Notice: Subject to any disclaimer, the term of this patent is extended or adjusted under 35 U.S.C. 154(b) by 0 days.

(21) Appl. No.: 11/928,749

(22) Filed: Oct. 30, 2007

(65) Prior Publication Data

US 2008/0059367 A1 Mar. 6, 2008

Related U.S. Application Data

(63) Continuation of application No. 09/570,245, filed on May 12, 2000.

(51) Int. Cl.
*G06Q 40/00* (2006.01)
(52) U.S. Cl. .......................................... 705/35; 705/39
(58) Field of Classification Search ................. 705/35, 705/39
See application file for complete search history.

(56) References Cited

U.S. PATENT DOCUMENTS

| | | | |
|---|---|---|---|
| 5,220,501 A | 6/1993 | Lawlor et al. | |
| 5,465,206 A | 11/1995 | Hill | |

(Continued)

FOREIGN PATENT DOCUMENTS

WO    EP 0745961 A2    12/1996

(Continued)

OTHER PUBLICATIONS

Deloitte & Touche Teams with Novell to Offer Security and Authorization Services for PeopleSoft PR Newswire. New York: Jan. 25, 2000. p. 1.*

(Continued)

*Primary Examiner*—Lalita M Hamilton
(74) *Attorney, Agent, or Firm*—Sutherland Asbill & Brennan, LLP (57) ABSTRACT

A method for enabling two businesses to complete a transaction that includes payment from one business (the buyer) to another business (the seller). A payment enabler operates the money transfer service over a computer network of nodes, such as the Internet. Typically, the buyer and the seller use the money transfer service of the payment enabler to consummate a transaction that they have arranged over the computer network through a business-to-business transaction facilitator that enables businesses to arrange deals over the computer network. During registration with the payment enabler, a buyer typically provides information about a bank account from which the seller will be paid, and the seller typically provides information about a bank account for receiving the funds from the buyer. The payment enabler facilitates payments for transactions between businesses by enabling the employees of a business registered with the payment enabler to direct the various phases of the payment process on behalf of the business for which those employees work. A super user employee, identified by the business during registration with the payment enabler, has the power to register other employees of the business with the payment enabler and to specify the privileges that the payment enabler should grant each employee to act on behalf of the business.

21 Claims, 7 Drawing Sheets

U.S. PATENT DOCUMENTS

| | | | |
|---|---|---|---|
| 5,555,496 | A | 9/1996 | Tackbary et al. |
| 5,629,982 | A | 5/1997 | Macali |
| 5,677,955 | A | 10/1997 | Doggett et al. |
| 5,699,528 | A | 12/1997 | Hogan |
| 5,732,400 | A | 3/1998 | Mandler et al. |
| 5,745,886 | A | 4/1998 | Rosen |
| 5,757,917 | A | 5/1998 | Rose et al. |
| 5,826,241 | A | 10/1998 | Stein et al. |
| 5,880,446 | A | 3/1999 | Mori |
| 5,899,980 | A | 5/1999 | Wilf et al. |
| 5,960,412 | A | 9/1999 | Tackbary et al. |
| 5,970,475 | A | 10/1999 | Barnes et al. |
| 5,974,146 | A | 10/1999 | Randle et al. |
| 6,006,205 | A * | 12/1999 | Loeb et al. .................. 705/34 |
| 6,029,150 | A | 2/2000 | Kravitz |
| 6,032,133 | A | 2/2000 | Hilt et al. |
| 6,070,150 | A | 5/2000 | Remington et al. |
| 6,070,798 | A | 6/2000 | Nethery |
| 6,081,790 | A | 6/2000 | Rosen |
| 6,098,053 | A | 8/2000 | Slater |
| 6,119,106 | A | 9/2000 | Mersky et al. |
| 6,122,625 | A | 9/2000 | Rosen |
| 6,167,386 | A | 12/2000 | Brown |
| 6,175,823 | B1 | 1/2001 | Van Dusen |
| 6,202,054 | B1 | 3/2001 | Lawlor et al. |
| 6,246,996 | B1 | 6/2001 | Stein et al. |
| 6,292,789 | B1 | 9/2001 | Schutzer |
| 6,317,745 | B1 | 11/2001 | Thomas et al. |
| 6,343,279 | B1 | 1/2002 | Bissonette |
| 6,411,942 | B1 | 6/2002 | Fujimoto |
| 6,449,599 | B1 | 9/2002 | Payne et al. |
| 6,618,705 | B1 | 9/2003 | Wang |
| 2002/0023055 | A1 | 2/2002 | Antognini et al. |

FOREIGN PATENT DOCUMENTS

| | | |
|---|---|---|
| WO | EP 0 745 961 A3 | 7/1998 |
| WO | WO 9849644 | 11/1998 |
| WO | WO 9922291 | 5/1999 |
| WO | EP 0 949 596 A2 | 10/1999 |
| WO | WO 00/22559 A1 | 4/2000 |
| WO | WO 00/54122 A2 | 9/2000 |
| WO | WO 00/67177 A2 | 11/2000 |
| WO | WO 00/79452 A2 | 12/2000 |
| WO | WO 01/04816 A1 | 1/2001 |
| WO | EP 1 077 436 A2 | 2/2001 |

OTHER PUBLICATIONS

T. Rowe Price Selects IntraVerse Framework for Enterprise Authorization PR Newswire. New York: Dec. 7, 1998, p. 1.*
"Billpoint Web Site," found on the World Wide Web at http://www.billpoint.com.
"I-Escrow Web Site," found on the World Wide Web at http://www.iescrow.com.
"PayMyBills.com Web Site," found on the World Wide Web at http://www.paymybills.com.
"PayPal Web Site," found on the World Wide Web at http://www.paypal.com.
"PayMe.com Web Site," found on the World Wide Web at http://www.payme.com.
"eCount Web Site," found on the World Wide Web at http://www.ecount.com.
"Tradesafe.com Web Site", found on the World Wide Web at http://www.tradesafe.com.
"eMoneyMail Web Site," found on the World Wide Web at http://www.emoneymail.com.
dotBANK: "The way to send and receive money on the Internet" retrieved from the Internet on Feb. 7, 2000 at http://www.dotbank.com/; pp. 1-7.
AmeriNet, Inc.: "The Best Idea in Payment Systems Since the Credit Card" retrieved from the Internet on Feb. 7, 2000 at http://www.debit-ti.com/; pp. 1-8.
TransPoint: "The Way to Pay Online the Service" retrieved from the Internet on Feb. 10, 2000 at http://transpoint.com/service_questions.asp; pp. 1-12.
Intell-a-Check!: "The Way to get Paid" retrieved from the Internet on Feb. 7, 2000 at http://www.icheck.com/; pp. 1-7.
TeleCheck: "Making Checks our Responsibility" retrieved from the Internet on Feb. 7, 2000 at http://telecheck.com/home/home.html; pp. 1-8.
Citibank: "Citibank offers cutting-edge technology to small business," M2 Communications, Oct. 8, 1996.
"TCAM Systems, Union Discount Team to Enhance and Market TCAM's Money Market System." Computer Business Review Online. From Issue No. 1331. Dec. 20, 1989.
International Search Report for PCT/US 01/ 15352 dated May 8, 2002.
International Preliminary Examination Report for PCT/US 01 / 15352 dated Sep. 1, 2004.
Disclosure Under 37 C. F. R. 1.56 dated Feb. 25, 2009.

* cited by examiner

METHOD AND SYSTEM FOR TRANSFERRING MONEY IN BUSINESS-TO-BUSINESS INTERNET TRANSACTIONS

CROSS REFERENCE TO RELATED APPLICATIONS

This application is a continuation and claims benefit of U.S. patent application Ser. No. 09/570,245, filed May 12, 2000, entitled "Method and System for Transferring Money in Business-to-Business Internet Transactions," by William L. Anuszewski et al., the disclosure of which is hereby incorporated herein in its entirety by reference.

FIELD OF THE INVENTION

The invention relates generally to computer-implemented financial transactions, and more particularly relates to completing a transaction between two businesses by transferring money from one business to the other according to instructions received online from authorized employees of those businesses.

BACKGROUND OF THE INVENTION

Business-to-business e-commerce is experiencing dramatic growth. Many of these transactions take place over the Internet at a Web portal that serves as a transaction facilitator by introducing businesses to each other and facilitating the closing of deals between businesses. For example, trading exchanges and business-to-business auction sites are examples of transaction facilitators that are becoming increasingly common on the Web.

A particular problem experienced by businesses that engage in e-commerce is finding a safe and convenient method to transfer money from one business (typically a buyer of goods or services) to a second business (typically a seller of the goods or services) per the terms of a transaction. At present, very few of the online transaction facilitators offer online payment services. Those online payment services that do exist are complex and not well suited to the particular needs of business-to-business e-commerce.

Specifically, a business acts only when employees of that business perform actions on the behalf of the business. There has not heretofore been an online payment service that simply and efficiently manages the process of enabling employees of a business to execute payments on behalf that business for the purpose of consummating an online financial transaction. Therefore, there is a need in the art for an online payment service that is easy to use and suitable for the needs of business-to-business e-commerce.

SUMMARY OF THE INVENTION

The present invention meets the needs described above in a computer-implemented service that enables two business to complete a transaction that includes payment from one business (the buyer) to another business (the seller). A payment enabler operates the money transfer service over a computer network of nodes, such as the Internet. Typically, the buyer and the seller use the money transfer service of the payment enabler to consummate a transaction that they have arranged over the computer network through a business-to-business transaction facilitator that enables businesses to arrange deals over the computer network.

During registration with the payment enabler, a buyer typically provides information about a bank account from which the seller will be paid, and the seller typically provides information about a bank account for receiving the funds from the buyer. Advantageously, the payment enabler facilitates payments for transactions between businesses by enabling the employees of a business registered with the payment enabler to direct the various phases of the payment process on behalf of the business for which those employees work. A super user employee, identified by the business during registration with the payment enabler, has the power to register other employees of the business with the payment enabler and to specify the privileges that the payment enabler should grant each employee to act on behalf of the business.

Generally described, the present invention comprises a method for providing a business-to-business payment service through a computer server. The computer server receives notification of an amount owed from a first business to a second business per an agreed upon transaction. The computer server then verifies that a first employee of the first business has been granted a privilege to authorize payment of the amount owed on behalf of the first business. Next, the computer server receives from a remote computer of the first employee a command to pay the second business the amount owed. Subsequently, the computer server orders a first transfer of the amount owed from a bank account of the first business into a first intermediary bank account through direct debit of the bank account of the first business. Finally, the computer server orders a second transfer of the amount owed from a second intermediary bank account to a bank account of the second business via a direct deposit into the bank account of the second business. Optionally, the first bank account comprises the second bank account.

According to an aspect of the invention, the computer server offering the business-to-business payment service also enables a remote super user employee of the first business to register other employees of the first business with the server and to specify privileges that the server should grant each of the other employees to act on behalf of the first business. These privileges may include a privilege to provide the server with transaction details, a privilege to confirm the transaction details without binding the first business to complete payment using the server, a privilege to authorize payment on behalf of the first business up to a specified limit, and a privilege to inquire about a transaction status.

The various aspects of the present invention may be more clearly understood and appreciated from a review of the following detailed description of the disclosed embodiments and by reference to the appended drawings and claims.

DETAILED DESCRIPTION OF EXEMPLARY EMBODIMENTS

The present invention is typically embodied in a computer-implemented service that enables two businesses to complete a transaction that includes payment from one business (the buyer) to another business (the seller). A payment enabler operates the money transfer service over a computer network of nodes, such as the Internet. Typically, the buyer and the seller use the money transfer service of the payment enabler to consummate a transaction that they have arranged over the computer network through a business-to-business transaction facilitator, such as a business-to-business auction site or any other computer network server that enables businesses to arrange deals over the computer network.

Before providing the money transfer service to the buyer and the seller, the payment enabler typically requires that the buyer and the seller register for the service. The payment enabler operates a payment enabler server connected to the computer network in order to facilitate registration and use of the money transfer service by the buyer and the seller.

To register with the payment enabler, the buyer and the seller each provide the payment enabler server with registration information that may include contact information and information that the payment enabler server uses to verify the legitimacy of the business. Before accepting the registration of the buyer or the seller, the payment enabler server may also require the buyer or the seller to provide information that the payment enabler uses to conduct an underwriting investigation of the buyer or the seller. If the buyer or the seller does not meet underwriting requirements, then the payment enabler may refuse to register that buyer or seller.

During registration with the payment enabler, a business also provides information about a bank account. Through registration of a bank account, the payment enabler obtains the right to perform direct debits from a buyer's bank account to a bank account of the payment enabler. The payment enabler also obtains the right to perform direct deposits into a seller's bank account from a bank account of the payment enabler. The buyer and the seller may be located in different countries, and the payment enabler should comply with the applicable laws of the buyer's country when debiting the buyer's bank account and with the applicable laws of the seller's country when performing a direct deposit into the seller's bank account.

Once a buyer has authorized payment of an amount of money to the seller, the payment enabler debits the registered bank account of the buyer and deposits the proceeds into a first bank account of the payment enabler. Subsequently, the payment enabler credits the seller by transferring funds from a second bank account of the payment enabler to the registered bank account of the seller.

The first bank account and the second bank account of the payment enabler may be the same bank account. Alternatively, the first bank account and the second bank may be separate accounts because the payment enabler may find such an arrangement more convenient. For example, the payment enabler may wish to maintain one bank account for making payments and one bank account for receiving payments.

As already described, the bank account of the seller and the bank account of the buyer may be located in different countries. To more easily comply with the banking laws of those countries, the payment enabler may prefer to maintain one bank account in the buyer's country for receiving transfers from the buyer's bank account and one bank account in the seller's country for making transfers to the seller's bank account.

A business acts only when employees of that business perform actions on the behalf of that business. Accordingly, the present invention facilitates payments for transactions between businesses by enabling the employees of a business registered with the payment enabler to direct the various phases of the payment process on behalf of the business for which those employees work.

Specifically, the payment enabler server maintains a database of employees of the business who are authorized to act on behalf of that business. For each employee in the database, the database also indicates the privileges that employee has to act on behalf of the business. For example, an employee of a seller may have the privilege of inquiring about the status of transactions and/or authorizing receipt of funds into the registered bank account of the seller. An employee of the buyer may have one or more of the following privileges: inquiring about the status of transactions, informing the payment enabler server about transaction details, confirming the correctness of transaction details transmitted to the payment enabler server, and authorizing payment up to a specified limit. Different employees of the same buyer may have different maximum limits on the payment amount those employees can authorize. When an employee of a business interacts with the payment enabler server, the payment enabler server consults the database to determine the privileges that have been granted to that employee and allows that employee to exercise only the indicated privileges.

During the registration process, the payment enabler typically requires a business to identify a super user employee. This super user employee has the power to register other employees of the business with the payment enabler. To exercise this power, the super user employee can add other employees to and delete other employees from the database of the payment enabler server. The super user employee also has the power to enter and modify the privileges that the payment enabler server should grant each employee.

With the help of the figures, in which like numerals refer to like elements throughout the several figures, the detailed description now elaborates on the present invention.

Overview of the Business-to-Business Transaction Process

Figure 1:
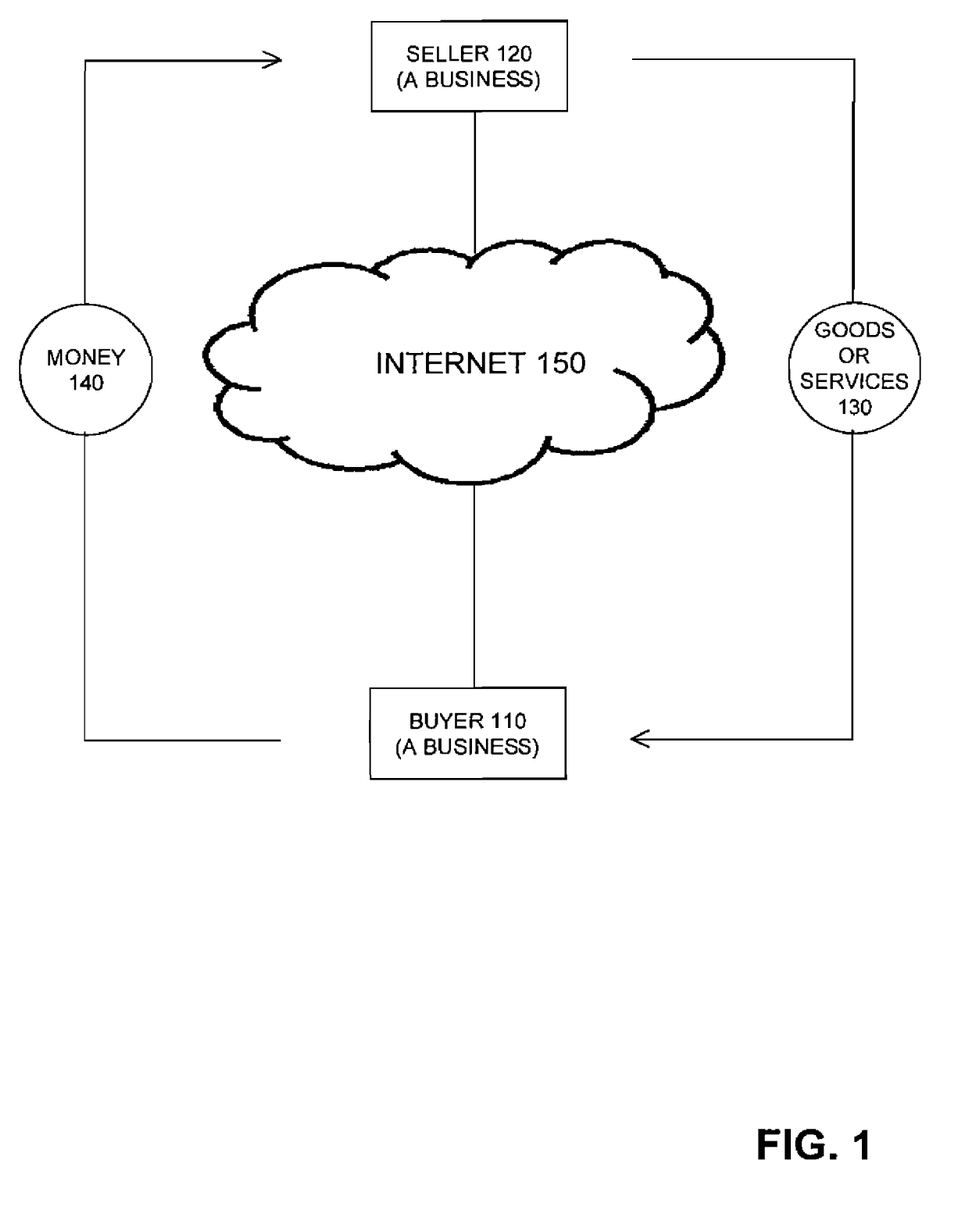
FIG. 1 is a block diagram illustrating a typical scenario in which a business-to-business Internet payment service would be beneficial.

FIG. 1 illustrates a typical scenario 100 in which a business-to-business Internet payment service would be beneficial. The scenario 100 depicts a buyer 110 and a seller 120, both of which are businesses. The buyer 110 and the seller 120 have concluded an agreement over a computer network, such as the Internet 150. Per this agreement, the seller 120 has promised to provide the buyer 110 with goods or services 130. In return, the buyer 110 has promised to pay the seller 120 an amount of money (also called a payment) 140. The business-to-business payment service of the present invention provides a convenient solution for enabling the buyer 110 and the seller 120 to consummate the financial aspects of the transaction to which they have agreed.

Figure 2:
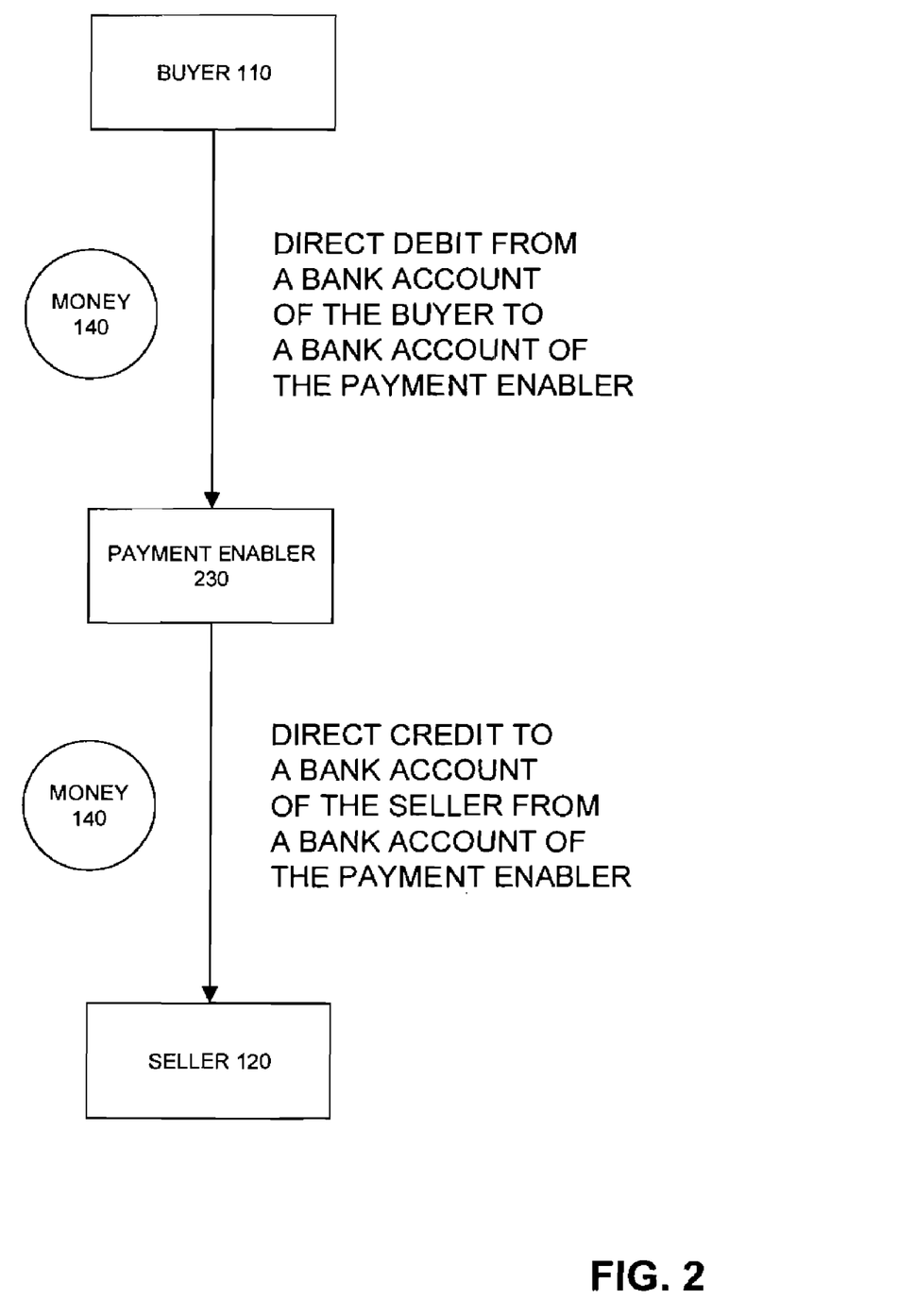
FIG. 2 is a block diagram illustrating the transfer of money through an Internet business-to-business payment service offered by a payment enabler in accordance with an exemplary embodiment of the present invention.

FIG. 2 provides an illustration 200 of the transfer of money through an Internet business-to-business payment service offered by a payment enabler 230. Generally, the responsibilities of the payment enabler 230 include collecting the payment 140 from the buyer 110 and paying the seller 120.

Typically, the payment enabler 230 requires the buyer 110 to register a bank account that the payment enabler can directly debit, and the payment enabler requires the seller 120 to register a bank account that the payment enabler can directly credit through a direct deposit. The payment enabler 230 may deposit the money 140 obtained from debiting the registered bank account of the buyer 110 into a first bank account of the payment enabler. The payment enabler 230 may perform the direct deposit into the registered bank account of the seller 120 by transferring an amount of money 140 from a second bank account of the payment enabler directly into the registered bank account of the seller. The first bank account and the second bank account of the payment enabler 230 may, but need not, be the same bank account.

The bank account of the buyer 110 and the bank account of the seller 120 may both be located in the same country, such as the United States. Alternatively, the bank account of the buyer 110 and the bank account of the seller 120 may be in different countries. When performing a transfer of money between two bank accounts, the payment enabler 230 should comply with the applicable banking laws and customs of the country or countries in which the bank accounts and/or the goods or services involved in the transfer are located.

When performing a transfer of money between two bank accounts that are both located in the United States, the automated clearinghouse (ACH) network may be used. Many other countries also have mechanisms available to facilitate the transfer of money between two bank accounts. Methods for transferring money between bank accounts located in different countries are also known to those skilled in the art and may be incorporated herein.

Because the payment enabler 230 acts as a financial intermediary between two parties, the buyer 110 and the seller 120, the payment enabler 230 may experience various types of risk depending on the details of the payment process. Generally, two types of risk which the payment enabler 230 may experience are the risk of nonpayment by the buyer 110 and foreign exchange risk. These two types of risk will now be discussed in turn.

By receiving the payment 140 from the buyer 110 before transferring payment to the seller 120, the payment enabler 230 can eliminate the first risk, the risk of nonpayment by the buyer. On the other hand, the payment enabler 230 may choose to pay the seller 120 before receiving payment 140 from the buyer 110. In this case, the payment enabler 230 typically assumes the risk of nonpayment by the buyer 110. However, the payment enabler 230 can reduce the risk of nonpayment by the buyer 110 through careful underwriting when determining whether or not to offer the payment service to the buyer or when determining how much to charge the buyer 110 for the service. The payment enabler 230 can also eliminate the risk of nonpayment by the buyer 110 by paying a third party (not shown) to assume the risk of nonpayment by the buyer.

Foreign exchange risk, the second type of risk, occurs only when the buyer 110 pays in a different currency than the currency in which the seller 120 receives payment. This foreign exchange risk occurs because the relative value of different currencies tends to fluctuate on a daily basis and because transfers of money between two bank accounts typically do not occur instantaneously. As with the risk of nonpayment by the buyer 110, the payment enabler 230 may assume the foreign exchange risk. Alternatively, the payment enabler 230 may pay a third party (not shown) to assume the foreign exchange risk or require the seller 120 to assume the foreign exchange risk.

The payment enabler 230 typically charges a fee for offering the Internet business-to-business payment service. The payment enabler 230 may charge this fee to the buyer 110, the seller 120, or both. The payment enabler 230 may collect this fee by debiting it from the bank account of the buyer 110. The fee may also be charged as a percentage of the amount 140 of the transaction.

The fee of the payment enabler 230 preferably covers operating expenses and a profit. As the exact terms of settlement for the buyer 110 and the seller 120 affects the degree of risk that the payment enabler 230 assumes, the fee charged by the payment enabler preferably corresponds to the settlement terms. Because shorter settlement periods are typically more difficult to accommodate, the payment enabler preferably charges more for shorter settlement periods than for longer settlement periods.

Preferably, the payment enabler 230 offers the buyer 110 or the seller 120 a variety of settlement options, each priced to accommodate the implementation difficulty experienced by the payment enabler and the degree of risk assumed by payment enabler. For example, the payment enabler 230 may offer the buyer 110 the opportunity to choose anywhere from one to five settlement days, with the one settlement day option being the most expensive and the five settlement days option being the least expensive.

Computer Network for Enabling Business-to-Business Transactions

Figure 3:
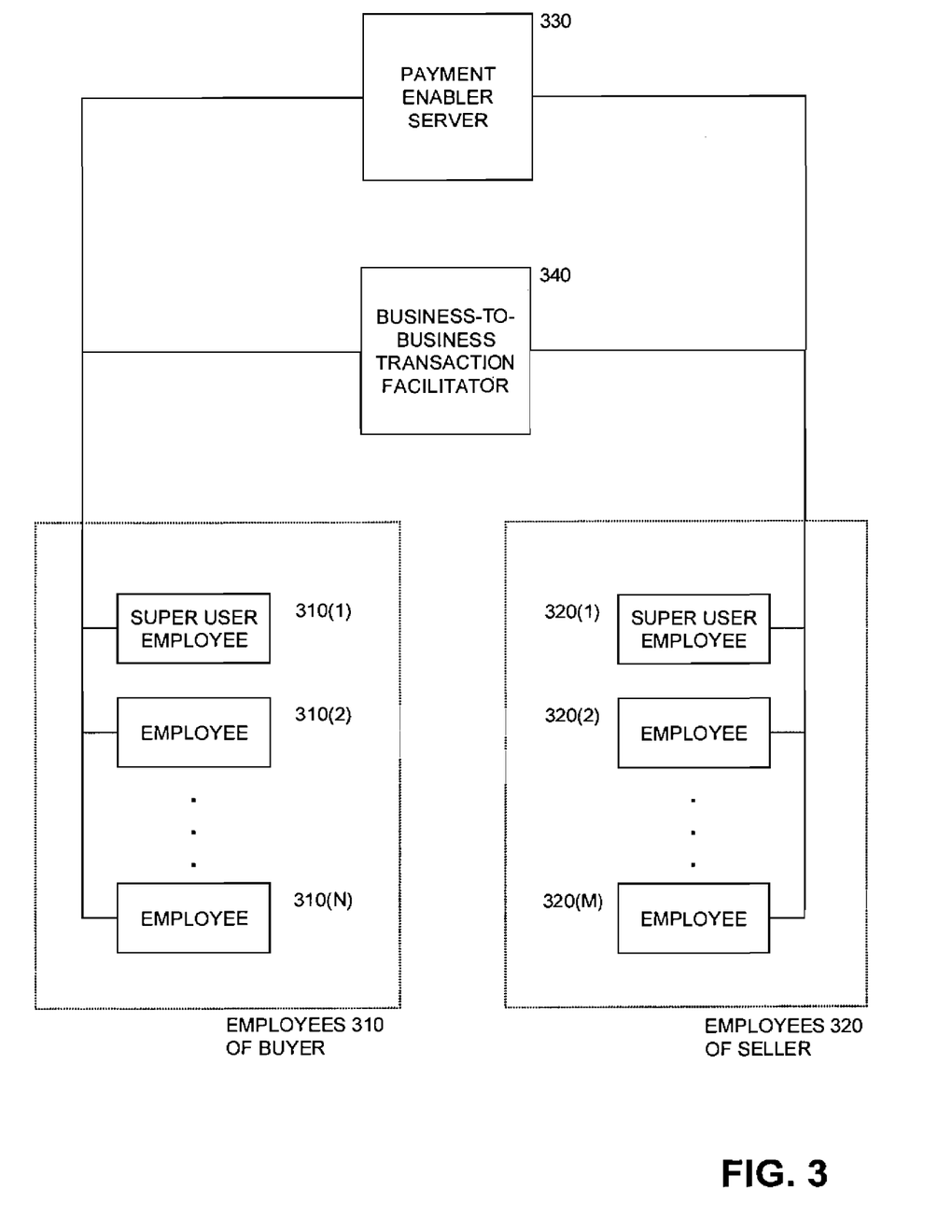
FIG. 3 is a block diagram illustrating a computer network architecture for enabling business-to-business transactions in accordance with an exemplary embodiment of the present invention.

FIG. 3 is a block diagram illustrating an exemplary computer network architecture 300 for enabling business-to-business transactions. The computer network 300 comprises computer nodes 330 and 340, which are both servers.

FIG. 3 also illustrates the employees 310 of the buyer 110 and the employees 320 of the seller 120. There are N employees 310 of the buyer 110, labeled 310(1) through 310(N). Likewise, there are M employees 320 of the seller 120, labeled 320(1) through 320(M). Although FIG. 3 indicates that the employees 310 and 320 are directly connected to the computer network 300, it should be understood that the employees 310 and 320 may each access the computer network through additional computer nodes that are not shown.

In FIG. 3, the lines connecting the various nodes of the computer network 300 illustrate network communication connections. For example, these connections may be Internet connections or intranet connections. Instead, a given connection between two computers of the network 300 may be a dedicated connection intended to provide a high speed, special purpose communications link between the two computers. When a first computer node is described as remote to a second computer node, the first computer node and the second computer node are linked by a network communication connection.

In one embodiment of the present invention, the network communication connections of FIG. 3 are all Internet connections. In an alternative embodiment of the present invention, the nodes of the employees 310 form one intranet and the lines linking these employees 310 therefore represent intranet connections, and the nodes of the employees 320 form a second intranet and the lines linking these employees 320 therefore also represent intranet connections. In this alternative embodiment, each of these intranets is linked to the Internet 150 through a gateway (not shown), thereby providing the employees 310 and 320 with access to the Internet generally and the computer servers 330 and 340 specifically.

The computer servers 330 and 340, in turn, are connected to each other, the two gateways, and the rest of the Internet 150 through Internet connections.

One skilled in the art will appreciate that the network practicing an embodiment of the present invention may take various forms. Accordingly, one may use other types of networks and combinations of network connections in a given embodiment of the present invention.

Each node of the network 300 may have typical features of a computer system, such as a processing unit, a system memory containing random access memory (RAM) and read only memory (ROM), and a system bus that couples the system memory to the processing unit. The computer may also include various memory storage devices, such as a hard disk drive, a magnetic disk drive (e.g., to read from or write to a removable magnetic disk), and an optical disk drive (e.g., to read from or write to optical media such as a CD-ROM or DVD).

A number of program modules may be stored in the drives and RAM of the computer system. Program modules control how the computer system functions and interacts with the user, with input/output devices, or with other computers. Program modules include routines, an operating system, application program modules, data structures, browsers, and other software or firmware components. The invention may conveniently be implemented in various program modules that are stored on the computers of the network 300 and implement the methods described in the detailed description.

No particular programming language will be described for carrying out the various procedures described in the detailed description because it is considered that the operations, steps, and procedures described and illustrated in the accompanying drawings are sufficiently disclosed to permit one of ordinary skill in the art to practice an exemplary embodiment of the present invention. Moreover, there are many computers and operating systems which may be used in practicing an exemplary embodiment, and therefore no detailed computer program could be provided which would be applicable to all of these many different systems. Each user of a particular computer will be aware of the language and tools which are most useful for that user's needs and purposes.

Likewise, various computer nodes of the network 300 require one or more databases for storing information pertinent to that computer's role in facilitating business-to-business transactions over the computer network 150. In the detailed description, these databases are frequently described with respect to their functionality or the types of information they store. One skilled in the art should recognize that a variety of different databases and a variety of different record structures for storing information in those databases are available for providing the described functionality or storing the described information. Accordingly, details of such database implementations need not be described. Where details of a database implementation are described, the detailed description provides them by way of example, not by way of limitation.

Still referring to FIG. 3, the detailed description will now describe the functionality of the various computer nodes of the computer network 300. The employees 310 of the buyer 110 and the employees 320 of the seller 120 communicate with the computer network 300 through computers (not shown). Over the computer network connections previously described, the employees 310 and 320 participate in the business-to-business transaction by interacting with the business-to-business transaction facilitator 340 and the payment enabler server 330. This interaction between the servers 330 and 340 and the employees 310 and 320 preferably occurs through Web pages transmitted using HyperText Transfer Protocol (HTTP). To use these Web pages, the computers through which the employees 310 and 320 connect to the computer network 150 typically run an appropriate Web browser.

In addition to enabling the servers 330 and 340 to communicate information to the employees 310 and 320, the described Web pages also provide a convenient graphical user interface for receiving information from the employees 310 and 320. For example, forms, which are well known to those skilled in the art of Web design, provide an easy and efficient mechanism for soliciting and receiving information from the employees 310 and 320 through Web pages. However, other communication protocols and other graphical user interfaces are known to those skilled in the art, and therefore these communication alternatives may be used to implement the present invention.

Initially, a transaction facilitator 340 typically serves as an intermediary that helps the buyer 110 and the seller 120 to close a deal. Quite often, the transaction facilitator 340 also serves to introduce the buyer 110 and the seller 120 in the first place. A typical transaction facilitator 340 comprises a business-to-business auction site or online marketplace. However, the transaction facilitator 340 may be any computer network server that enables businesses to arrange deals over the computer network 150.

Once the buyer 110 and the seller 120 have agreed upon the terms of a transaction using the transaction facilitator 340, they use the business-to-business payment service accessible through the payment enabler server 330 in order to complete the transfer of money required by the agreed upon transaction. In one embodiment of the present invention, the functions of the payment enabler server 330 and the transaction facilitator 340 are integrated into a single server (not shown). Preferably, the payment enabler server 330 and the transaction facilitator 340 are separate servers operated by two different entities.

Degree of Integration Between the Payment Enabler Server and the Transaction Facilitator When the payment enabler server 330 and the transaction facilitator 340 are two different servers, varying degrees are integration between them are possible. One possibility is that there is no integration at all between the payment enabler server 330 and the transaction facilitator 340. In this case, the buyer 110 and the seller 120 agree upon the terms of their transaction either using the transaction facilitator 340 or offline. To use the money transfer service of the payment enabler 230, the buyer 110 and the seller 120 register with the payment enabler server 330, provide their transaction details to the payment enabler server themselves, and directly interact with the payment enabler server to fulfill the requirements of the money transfer process.

A second model of integration between the payment enabler server 330 and the transaction facilitator 340 is referred to as a loose integration model. In the loose integration model, the transaction facilitator 340 agrees to offer the employees 310 of the buyer 110 and the employees 320 of the seller 120 an optional click-through transition to the payment enabler server 330 for payment processing. In this case, users of the transaction facilitator 340 would have the option of using the payment processing service of the payment enabler 230, but would not be required to do so.

In response to an employee 310($x$) of the buyer 110 or an employee 320($x$) of the seller 120 clicking a button on the Web site of the transaction facilitator 340, the transaction facilitator transfers the employee to the payment enabler server 330 for payment processing. In this loose integration model, the transaction facilitator 340 typically does not forward transaction details to the payment enabler server 330, so an employee 310(*x*) of the buyer 110 or an employee 320(*x*) of the seller 120 still has to provide these details to the payment enabler server once the employee has been transferred to the payment enabler server.

In the loose integration model, the transaction facilitator 340 may, however, provide information to the payment enabler server 330 other than transaction details. For example, the transaction facilitator 340 may provide information about the buyer 110 and the seller 120 to the payment enabler server 330 in order to simplify the registration process for the buyer and the seller. In order to eliminate the necessity of requiring an employee 310(*x*) of the buyer 110 or an employee 320(*x*) of the seller 120 to log into the payment enabler server 330 whenever such an employee clicks through to the payment enabler server from the transaction facilitator 340, the transaction facilitator may identify the employee to the payment enabler server during the click-through.

During such a click-through transition from the transaction facilitator 340 to the payment enabler server 330, the transaction facilitator may also identify itself to the payment enabler server. The identity of the referring transaction facilitator 340 may, in turn, affect the fees to be charged the buyer 110 and the seller 120 for payment processing, as well as money transfer limits that the payment enabler 230 will handle for the buyer and the seller.

A third model of integration between the payment enabler server 330 and the transaction facilitator 340 is referred to as a tight integration model. The tight integration model is similar to the loose integration model, except that the transaction facilitator 340 automatically forwards transaction details to the payment enabler server 330 so that the buyer 110 and the seller 120 do not have to provide the transaction details to the payment enabler server themselves. To use the payment service of the payment enabler 230, the employees 310 of the buyer 110 and the employees 320 of the seller 120 either log in directly to the payment enabler server 330 or get transferred to the payment enabler server by clicking through from the transaction facilitator 340.

One skilled in the art should appreciate that there are alternative methods for defining the level of cooperation between the transaction facilitator 340 and the payment enabler server 330. The transaction facilitator 340 may be compensated by the payment enabler 230 based on the degree of integration with the payment enabler server 330 to which the transaction facilitator has agreed.

Ensuring the Security of Business-to-Business Transactions

A variety of methods may be used to ensure the security of business-to-business transactions. For example, the payment enabler server 330 may assign a password to each of the employees 310 who are authorized to act on behalf of the buyer 110 and each of the employees 320 who are authorized to act on behalf of the seller 120. By requiring a given employee 310(*x*) or 320(*x*) to provide their password whenever the employee logs into the payment enabler server 330, the payment enabler server can help prevent unauthorized actions.

Whenever information is transmitted over the computer network 150 between a server 330 or 340 and an employee 310(*x*) or 320(*x*), the information may be encrypted. Likewise, information transmitted between the transaction facilitator 340 and the payment enabler server 330 may be encrypted. Such encryption methods are well known to those skilled in the art.

Preferably, communications between computers in the computer network 150 are verified using digital certificates, which are an application of encryption that is well known to those skilled in the art. The buyer 110 or the seller 120 may obtain a digital certificate during the process of registering with the payment enabler server 330. Each of the employees 310 of the buyer 110 may provide others with the same digital certificate of the buyer, and each of the employees 320 of the seller 120 may provide others with the same digital certificate of the seller.

Whenever an employee 310(*x*) or 320(*x*) communicates with the server 330 or 340, the employee may verify the digital certificate of the server and the server may verify the digital certificate of the employee. Likewise, the servers 330 and 340 may verify each other's digital certificates whenever they communicate. When a first party verifies the digital certificate of a second party in this manner while communicating over a computer network 150, the first party authenticates the identity of the second party.

Digital certificates also help a party receiving data to ensure that the data is sent from where it is supposed to be sent and that the data received has not been altered in transit. Because digital certificates help to authenticate a party to a communication, they can also be used to prevent repudiation of an agreed upon transaction by the buyer 110 or the seller 120.

Flow Charts for the Business-to-Business Transaction Process

Figure 4:
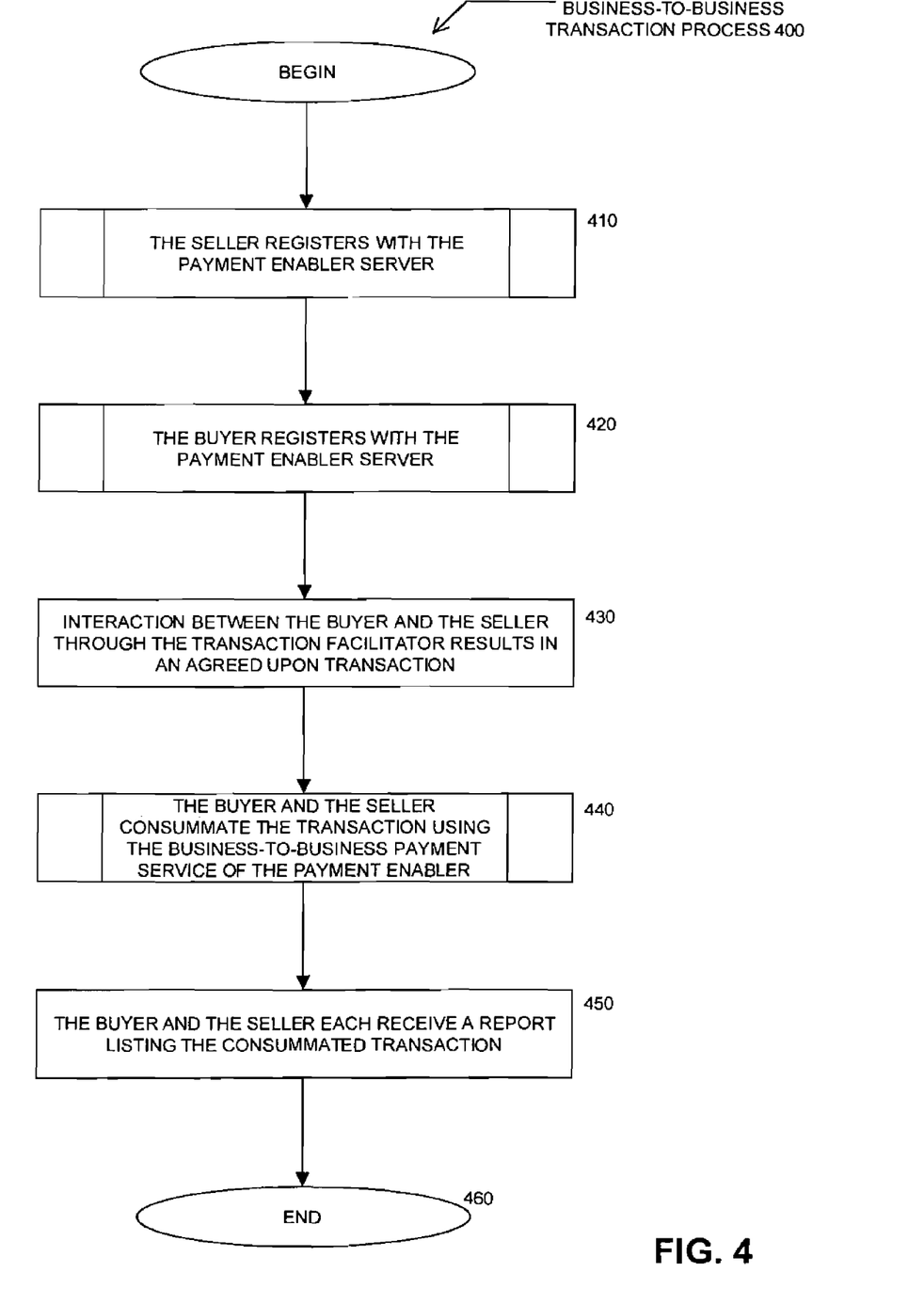
FIG. 4 is a flow chart illustrating the steps of a business-to-business transaction process in accordance with an exemplary embodiment of the present invention.

FIG. 4 shows the steps of an exemplary business-to-business transaction process 400. The process 400 begins with step 410, in which the seller 120 registers with the payment enabler server 330. In step 420, the buyer 110 registers with the payment enabler server 330.

A buyer 110 or a seller 120 may only need to register one time with the payment enabler server 330 in order for the payment enabler server to facilitate payments for multiple subsequent transactions for that buyer or seller. Each of the subsequent transactions of the buyer 110 can involve different counter parties, and each of the subsequent transactions of the seller 120 can also involve different counter parties. The following steps 430 through 450 describe only a single transaction between the buyer 110 and the seller 120.

In step 430, interaction between the buyer 110 and the seller 120 through the business-to-business transaction facilitator 340 results in an agreed upon transaction. Per this transaction, the seller 120 promises to provide the buyer 110 with goods or services 130, and the buyer promises to pay the seller an amount of money 140.

In step 440, the buyer 110 and the seller 120 consummate the financial aspects of the transaction using the business-to-business payment service of the payment enabler 230. Typically, the buyer 110 and the seller 120 access this business-to-business payment service over the computer network 150 through communication with the payment enabler server 330.

In step 450, the buyer 110 and the seller 120 may each receive a report listing the consummated transaction as completed. The report may also provide further, details of the transaction, such as the amount of the payment 140, the parties involved, the fees charged by the payment enabler 230, and the date of settlement. The report received by the buyer 110 may indicate other financial transactions that the buyer has completed using the payment enabler 230, and the report received by the seller 120 may indicate other financial transactions that the seller has completed using the payment enabler.

Such a report may be mailed through the postal service, e-mailed, or otherwise provided online to the buyer 110 or the seller 120. Generally, the payment enabler server 330 generates such a report. Alternatively, the transaction facilitator 340 may generate the report based upon information provided by the payment enabler server 330.

Typically, some of the employees 310 of the buyer 110 and some of the employees 320 of the buyer 120 also have privileges to inquire over the computer network 150 about the status of pending and completed financial transactions to which their employer is a party. Whether or not a given employee 310(x) or 320(x) has such privileges is stored in a database maintained by the payment enabler server 330. The business-to-business transaction process 400 ends in step 460.

Figure 5:
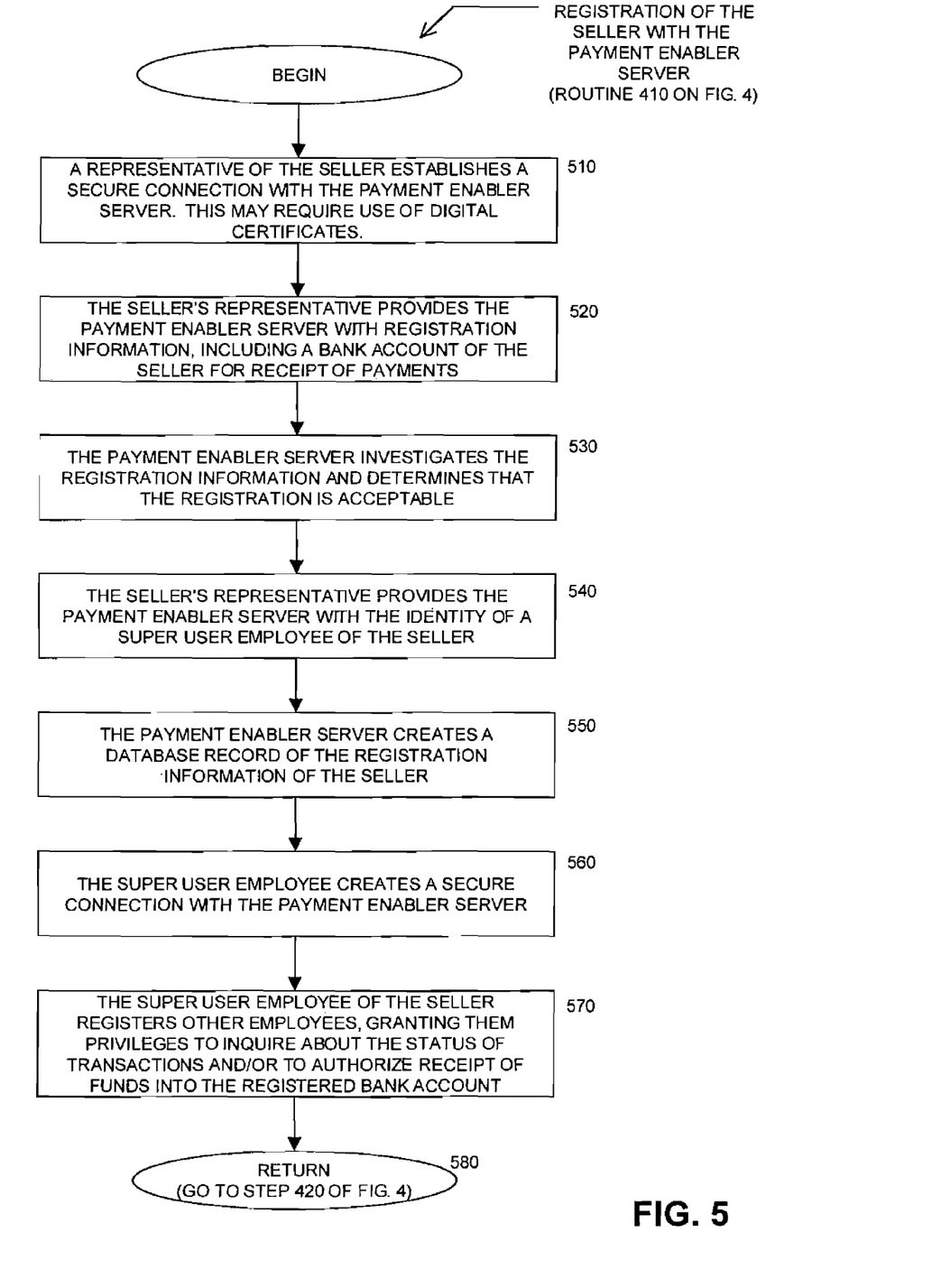
FIG. 5 is a flow chart illustrating the steps for registration of the seller with the payment enabler server in accordance with an exemplary embodiment of the present invention.

FIG. 5 is a logical flow diagram illustrating exemplary steps for registration of the seller 120 with the payment enabler server 330. The logical flow diagram of FIG. 5 comprises an exemplary process corresponding to routine 410 of FIG. 4. The routine 410 begins with step 510.

In step 510, a representative of the seller 120 establishes a secure connection with the payment enabler server 330. Typically, the representative is a high-ranking executive of the seller 120 having the authority and the sensitive information needed to complete the registration process. To establish the secure connection, the representative of the seller 120 and the payment enabler server 330 typically use digital certificates.

In step 520, the representative of the seller 120 provides the payment enabler server 330 with registration information that includes contact information through which the payment enabler 230 can communicate with the seller as well as information that the payment enabler server uses to verify the legitimacy and identity of the business. Additionally, the representative of the seller 120 also provides the payment enabler server 330 with information about a bank account into which the seller would like to receive proceeds from any financial transaction that the payment enabler server completes for the seller.

In step 530, the payment enabler server 330 investigates the registration information provided by the representative of the seller 120. For example, the payment enabler server 330 may check to ensure that the representative of the seller 120 had authority to act on behalf of the seller. The payment enabler server 330 may also verify the legitimacy of the seller 120.

Using the bank account information provided by the seller 120, the payment enabler server 330 establishes the right to directly credit the seller's bank account through direct deposit from a bank account of the payment enabler 230. This typically entails complying with the laws and customs of the country or countries in which the bank accounts are located.

If, upon review of the registration information supplied by the representative of the seller 120, the payment enabler 230 determines that the seller should not be granted the ability to use the business-to-business payment service, then the registration of the seller is refused. Otherwise, the registration is accepted and step 540 is executed.

In step 540, the representative of the seller 120 provides the payment enabler server 330 with the identity of a super user employee 320(1) of the seller (see FIG. 3). Upon receiving identification of the super user employee 320(1) of the seller, the payment enabler server 330 typically provides the representative of the seller 120 with a login identification and password with which the super user employee can access the functionality of the payment enabler server.

Preferably, there is only one super user employee 320(1) of the seller 120, though there may be multiple super user employees of the seller in alternative embodiments of the present invention. Generally, the super user employee 320(1) has the authority to register other employees 320(2) through 320(M) of the seller 120 to access the payment enabler server 330 and act on behalf of the seller. At any time, the super user employee 320(1) can add or remove other employees 320(2) through 320(M) from the database that the payment enabler server 330 uses to determine who is authorized to access the payment enabler server on behalf of the seller 120.

Furthermore, the super user employee 320(1) has the power to enter and at any time modify the privileges that the payment enabler server 330 should grant the registered employees 320(2) through 320(M) of the seller 120. The super user employee 320(1) can instruct the payment enabler server 330 to grant a given employee 320(x) of the seller 120 either or both of the following privileges: inquiring about the status of transactions and authorizing receipt of funds into the registered bank account of the seller. Preferably, an employee 320(x) of the seller 120 will only be allowed to inquire about the status of transactions that have been confirmed by the buyer 110.

In step 550, the payment enabler server 330 creates database records of the registration information of the seller 120 that has been provided up to this point. The payment enabler server 330 generally relies upon these records to carry out the business-to-business payment process. The payment enabler server 330 also relies upon these records to provide access to the functionality of the payment enabler server to the appropriate individuals.

Although steps 510 through 550 as described above are carried out over the computer network 150, it should be appreciated that the representative of the seller 120 could communicate with the payment enabler 230 offline to complete these registration steps. However, performing these registration steps online helps to automate the registration process and make it more efficient.

In step 560, the super user employee 320(1) creates a secure network connection with the payment enabler server 330. In step 570, the super user employee 320(1) registers other employees 320(2) through 320(M) of the seller 120, granting them the privileges that the super user employee determines they should have. The routine then returns in step 580.

Figure 6:
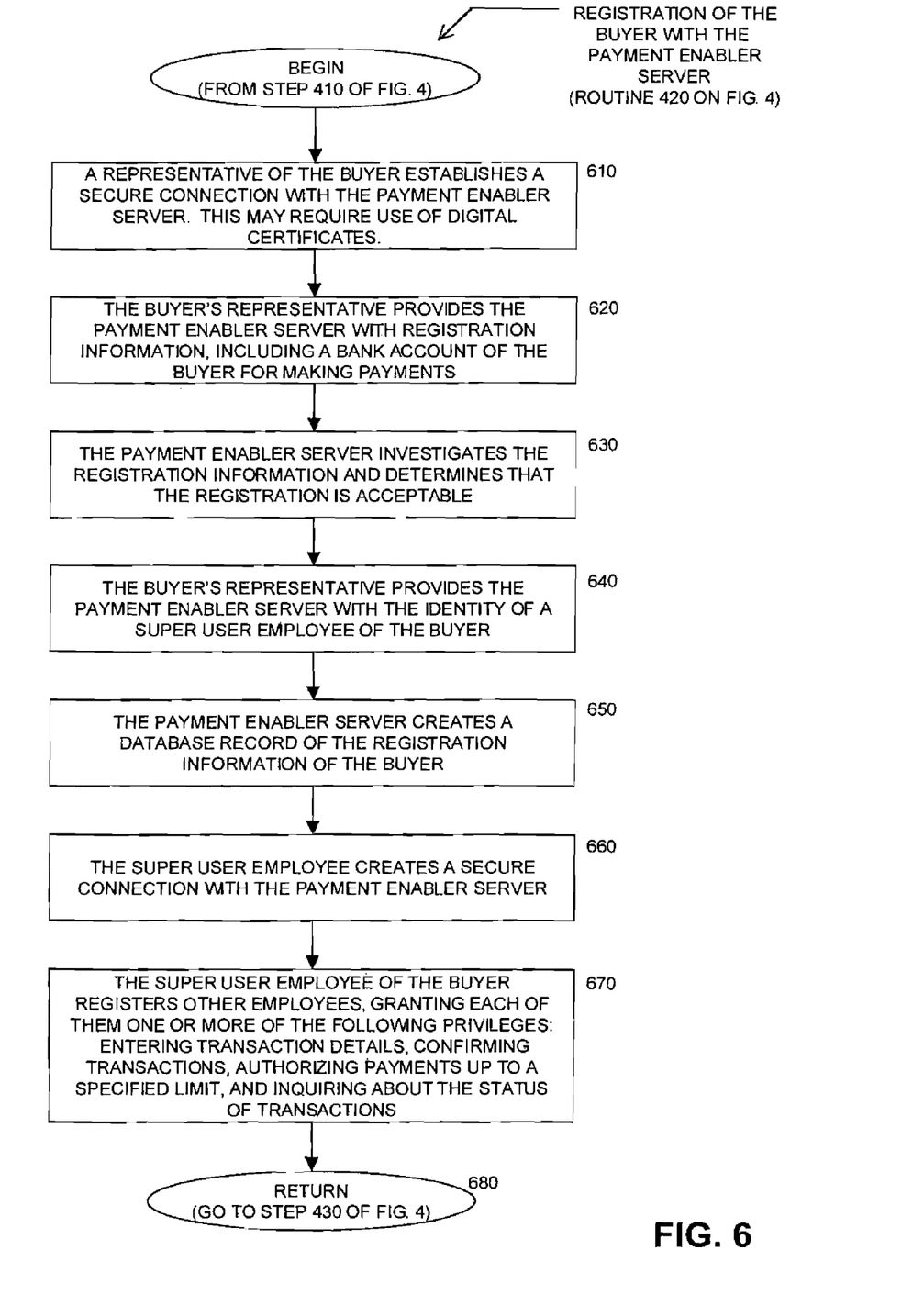
FIG. 6 is a flow chart illustrating the steps for registration of the buyer with the payment enabler server in accordance with an exemplary embodiment of the present invention.

FIG. 6 is a logical flow diagram illustrating exemplary steps for registration of the buyer 110 with the payment enabler server 330. The logical flow diagram of FIG. 6 comprises an exemplary process corresponding to routine 420 of FIG. 4. Generally, the steps of FIG. 6 for registration of the buyer 110 with the payment enabler server 330 parallel the steps of FIG. 5 for registration of the seller 120 with the payment enabler server. The routine 420 begins with step 610.

In step 610, a representative of the buyer 110 establishes a secure connection with the payment enabler server 330. Typically, the representative is a high-ranking executive of the buyer 110 having the authority and the sensitive information needed to complete the registration process. To establish the secure connection, the representative of the buyer 110 and the payment enabler server 330 typically use digital certificates.

In step 620, the representative of the buyer 110 provides the payment enabler server 330 with registration information that includes contact information through which the payment enabler 230 can communicate with the buyer as well as information that the payment enabler server uses to verify the legitimacy and identity of the business. The registration information may also include information that the payment enabler 230 can use to conduct an underwriting investigation of the buyer 110. Additionally, the representative of the buyer 110 also provides the payment enabler server 330 with information about a bank account from which the buyer would like to make payments in any financial transaction that the payment enabler server completes for the buyer.

In step 630, the payment enabler server 330 investigates the registration information provided by the representative of the buyer 110. For example, the payment enabler server 330 may check to ensure that the representative of the buyer 110 had authority to act on behalf of the buyer. The payment enabler server 330 may also verify the legitimacy of the buyer 110.

Using the information provided by the representative of the buyer 110, the payment enabler server 330 may conduct an underwriting investigation of the buyer 110. If the buyer 110 does not meet specified underwriting requirements, the payment enabler 330 may refuse registration of the buyer.

Using the bank account information provided by the buyer 110, the payment enabler server 330 establishes the right to directly debit the buyer's bank account by transferring money from the buyer's bank account to a bank account of the payment enabler 230. This typically entails complying with the laws and customs of the country or countries in which the bank accounts are located.

If, upon review of the registration information supplied by the representative of the buyer 110, the payment enabler 230 determines that the buyer should not be granted the ability to use the business-to-business payment service, then the registration of the buyer is refused. Otherwise, the registration is accepted and step 640 is executed.

In step 640, the representative of the buyer 110 provides the payment enabler server 330 with the identity of a super user employee 310(1) of the buyer (see FIG. 3). Upon receiving identification of the super user employee 310(1) of the buyer, the payment enabler server 330 typically provides the representative of the buyer 110 with a login identification and password with which the super user employee can access the functionality of the payment enabler server.

Preferably, there is only one super user employee 310(1) of the buyer 110, though there may be multiple super user employees of the buyer in alternative embodiments of the present invention. Generally, the super user employee 310(1) has the authority to register other employees 310(2) through 310(N) of the buyer 110 to access the payment enabler server 330 and act on behalf of the buyer. At any time, the super user employee 310(1) can add or remove other employees 310(2) through 310(N) from the database that the payment enabler server 330 uses to determine who is authorized to access the payment enabler server on behalf of the buyer 110.

Furthermore, the super user employee 310(1) has the power to enter and at any time modify the privileges that the payment enabler server 330 should grant the registered employees 310(2) through 310(N) of the buyer 110. The super user employee 310(1) can instruct the payment enabler server 330 to grant a given employee 310(x) of the buyer 110 one or more of the following privileges: inquiring about the status of transactions, informing the payment enabler server about transaction details, confirming transaction details transmitted to the payment enabler server, and authorizing payment up to a specified limit. Different employees 310 of the buyer 110 may have different maximum limits on the payment amount those employees can authorize.

In step 650, the payment enabler server 330 creates database records of the registration information of the buyer 110 that has been provided up to this point. The payment enabler server 330 generally relies upon these records to carry out the business-to-business payment process. The payment enabler server 330 also relies upon these records to provide access to the functionality of the payment enabler server to the appropriate individuals.

Although steps 610 through 650 as described above are carried out over the computer network 150, it should be appreciated that the representative of the buyer 110 could communicate with the payment enabler 230 offline to complete these registration steps. However, performing these registration steps online helps to automate the registration process and make it more efficient.

In step 660, the super user employee 310(1) creates a secure network connection with the payment enabler server 330. In step 670, the super user employee 310(1) registers other employees 310(2) through 310(N) of the buyer 110, granting them the privileges that the super user employee determines they should have. The routine then returns in step 680.

Although FIG. 5 provides an exemplary process for registration of the seller 120 with the payment enabler server 330 while FIG. 6 provides an exemplary process for registration of the buyer 110 with the payment enabler server, a given business may wish to act as a buyer in some transactions and as a seller in other transactions. Accordingly, a given business may wish to register with the payment enabler server 330 as both a buyer 110 and a seller 120. So long as the business provides the appropriate registration information to register as both a buyer 110 and a seller 120, the payment enabler server 330 may permit this.

Figure 7:
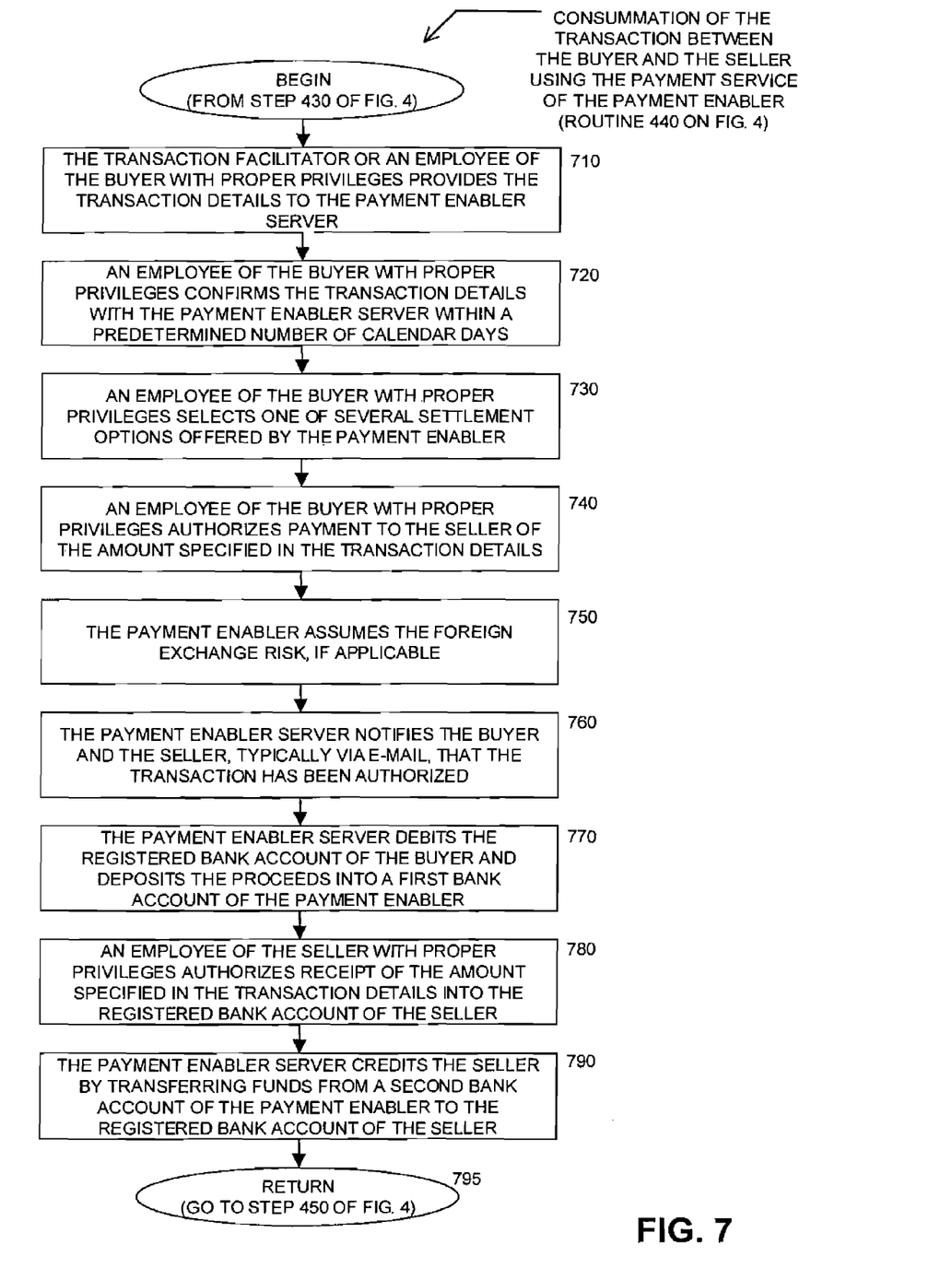
FIG. 7 is a flow chart illustrating the steps for consummation of the transaction between the buyer and the seller using the payment service of the payment enabler in accordance with an exemplary embodiment of the present invention.

FIG. 7 is a logical flow diagram illustrating exemplary steps for consummation of the financial aspects of the transaction between the buyer 110 and the seller 120 using the business-to-business payment service of the payment enabler 230. The logical flow diagram of FIG. 7 comprises an exemplary process corresponding to the routine 440 of FIG. 4.

In the logical flow diagram of FIG. 7, multiple steps may involve different employees of the buyer 110 and the seller 120 interacting with the payment enabler server 330 at different times through different communication sessions. It should be appreciated that there may be an authentication process each time one of the employees 310 or 320 establishes a communication session with the payment enabler server 330 in order to perform a step in the payment process 440. This authentication process may include requiring the employee 310 or 320 who is interacting with the payment enabler server 330 to provide a login identification and password. The authentication process may also include an exchange and verification of digital certificates. The routine 440 begins with step 710.

In step 710, the transaction facilitator 340 or an employee 310(x) of the buyer 110 provides the transaction details to the payment enabler server 330. In order for the employee 310(x) to provide the transaction details to the payment enabler server 330, that employee 310(x) must have been previously granted the privilege of informing the payment enabler server about transactions. Whether the transaction facilitator 340 or the employee 310(x) of the buyer 110 provides the transaction details to the payment enabler server 330 will depend on the particular implementation of the payment service and, more specifically, the degree of integration between the transaction facilitator and the payment enabler server. The maximum dollar amount 140 for a given transaction may vary depending on the particular transaction facilitator 340 that refers the transaction to the payment enabler server 330.

In step 720, an employee 310(y) of the buyer 110 is optionally required to confirm the transaction details with the payment enabler server 330. This employee 310(y) may or may not be the same as the employee 310(x) who provided the transaction details to the payment enabler server 330. "Confirmation" of transaction details refers to acknowledgement of the transaction and of the accuracy of its details by an employee 310(*y*) of the buyer 110 who has the privilege to confirm transactions. Even though the employee 310(*y*) confirms the transaction details, the payment enabler server 330 may not require the buyer 110 to proceed with the transaction at least until an employee 310(*z*) of the buyer authorizes the payment 140.

Preferably, the payment enabler server 330 requires an employee 310(*y*) of the buyer 110 to confirm the transaction within a predetermined number of calendar days from the time the transaction details were provided to the payment enabler server. If an employee 310(*y*) of the buyer 110 does not confirm the transaction within the specified time limit, the payment enabler server 330 will cancel the transaction and require the buyer 110 to reenter the transaction details at a later time should the buyer wish to proceed with the transaction.

Optionally, the payment enabler server 330 may provide the buyer 110 with the ability to amend or cancel the transaction anytime up until authorization of payment by the buyer 110. Also, the payment enabler server 330 may at this point notify the seller 120, possibly via e-mail, that the transaction has been confirmed.

In step 730, an employee 310(*z*) of the buyer 110 selects one of several settlement options offered by the payment enabler server 330. This employee 310(*z*) is typically the same as the employee who later authorizes the payment 140, but need not be. This employee 310(*z*) may or may not be the same as the employee 310(*x*) who notified the payment enabler 330 of the transaction or the employee 310(*y*) who confirmed the transaction. Typically, the employee 310(*z*) must have proper privileges to select a settlement option for the buyer 110. The privilege to authorize transactions may include the privilege to select a settlement option, but the power to select a settlement option may be a separate privilege.

In step 740, the employee 310(*z*) of the buyer 110 authorizes payment to the seller 120 of the amount specified in the transaction details. To do so, the employee 310(*z*) must have been previously granted the proper privileges by the super user employee 310(1). For the employee 310(*z*) to have proper privileges, the amount 140 of the present transaction must be within a dollar limit that the super user employee 310(1) specified when granting the employee 310(*z*) the ability to authorize payments.

In step 750, the payment enabler 230 assumes the foreign exchange risk if it is applicable because the buyer 110 and the seller 120 are located in different countries. In alternative embodiments, the payment enabler 230 pays a third party to assume the foreign exchange risk or passes the foreign exchange risk on to the seller 120.

In step 760, the payment enabler server 330 notifies the buyer 110 and the seller 120, typically via e-mail, that the transaction has been authorized. In step 770, the payment enabler server debits the registered bank account of the buyer 110 and deposits the proceeds into a first bank account of the payment enabler 230.

In step 780, which is optional, an employee 320(*x*) of the seller 120 authorizes the receipt of the amount specified in the transaction details into the registered bank account of the seller. Before allowing the employee 320(*x*) to authorize such receipt, the payment enabler server 330 typically requires that the employee 320(*x*) have been granted the privilege to do so by the super user employee 320(1) of the seller 120.

In step 790, the payment enabler server 330 credits the seller 120 by transferring funds from a second bank account of the payment enabler 230 to the registered bank account of the seller 120. The routine 440 then returns in step 795.

The detailed description has therefore described a business-to-business Internet payment service. Other alternative embodiments will become apparent to those skilled in the art to which an exemplary embodiment pertains without departing from its spirit and scope. Accordingly, the scope of the present invention is defined by the appended claims rather than the foregoing description.

The invention claimed is:

1. A computer-implementable method for providing a business-to-business payment service through a computer server, comprising:
    receiving at the server notification of an amount owed from a first business to a second business per an agreed upon transaction;
    verifying that a first employee of the first business has been granted a privilege to authorize payment of the amount owed on behalf of the first business by:
        receiving from a remote super user employee of the first business a command to grant the first employee a privilege to authorize payments up to a specified limit on behalf of the first business,
        storing in a database a record that indicates that the first employee has been granted the privilege to authorize payments up to the specified limit on behalf of the first business,
        finding the record in the database, and
        determining by the server that the amount owed is not greater than the specified limit;
    receiving from a remote computer of the first employee of the first business a command to pay the second business the amount owed;
    ordering by the server a first transfer of the amount owed from a bank account of the first business into a first intermediary bank account through direct debit of the bank account of the first business; and
    ordering by the server a second transfer of the amount owed from a second intermediary bank account to a bank account of the second business via a direct deposit into the bank account of the second business.

2. The method of claim 1, wherein the first intermediary bank account comprises the second intermediary bank account.

3. A computer-implementable method for providing a business-to-business payment service through a computer server, comprising:
    receiving at the server notification of an amount owed from a first business to a second business per an agreed upon transaction;
    enabling a remote super user employee of the first business to register other employees of the first business to interact with the server on behalf of the first business;
    verifying by the server that a first employee of the first business has been granted a privilege to authorize payment of the amount owed on behalf of the first business;
    receiving from a remote computer of the first employee of the first business a command to pay the second business the amount owed;
    ordering by the server a first transfer of the amount owed from a bank account of the first business into a first intermediary bank account through direct debit of the bank account of the first business; and
    ordering by the server a second transfer of the amount owed from a second intermediary bank account to a bank account of the second business via a direct deposit into the bank account of the second business.

4. The method of claim 3, further comprising enabling the remote super user employee of the first business to specify privileges that the server should grant each of the other employees to act on behalf of the first business.

5. The method of claim 4, wherein the privileges are selected from the group consisting of a privilege to provide the server with the transaction details, a privilege to confirm the transaction details without binding the first business to complete payment using the server, the privilege to authorize payment on behalf of the first business up to a specified limit, and a privilege to inquire about a transaction status.

6. The method of claim 4, wherein the other employees of the first business comprise the first employee of the first business.

7. The method of claim 3, wherein the first intermediary bank account comprises the second intermediary bank account.

8. The method of claim 3, wherein receiving at the server the notification of the amount owed from the first business to the second business per the agreed upon transaction comprises receiving the notification of the amount owed from an online transaction facilitator through which the first business and the second business have arranged the transaction.

9. The method of claim 3, wherein receiving at the server the notification of the amount owed from the first business to the second business per the agreed upon transaction comprises:
    verifying that a second employee of the first business has been granted a privilege to provide the server with transaction details; and
    receiving from a remote computer of the second employee of the first business the notification of the amount owed.

10. The method of claim 3, wherein the bank account of the first business and the bank account of the second business are located in different countries.

11. The method of claim 3, wherein the bank account of the first business and the bank account of the second business are located in different countries, and further comprising assuming a foreign exchange risk that arises because the first transfer and the second transfer are in different currencies.

12. The method of claim 3, wherein the bank account of the first business and the bank account of the second business are located in identical countries, ordering the first transfer amount owed comprises ordering the first transfer over an automated clearinghouse network, and ordering the second transfer of the amount owed comprises ordering the second transfer over the automated clearinghouse network.

13. The method of claim 3, further comprising establishing a secure network connection with the remote computer of the first employee of the first business through a mutual verification of digital certificates.

14. The method of claim 3, further comprising:
    verifying that a second employee of the first business has been granted a privilege to confirm transaction details without binding the first business to complete payment using the server; and
    receiving from a remote computer of the second employee of the first business a confirmation of the transaction.

15. The method of claim 14, further comprising determining if a predetermined number of calendar days have passed, from when the server received the notification of the amount owed, without receiving the confirmation of the transaction.

16. The method of claim 3, further comprising:
    offering a second employee of the first business a plurality of settlement options for completing both the first transfer and the second transfer; and
    receiving from a remote computer of the second employee a selection of one of the settlement options.

17. A computer system for providing a business-to-business payment service, comprising:
    a payment enabler computer server in communication with at least one network connection, and comprising memory, the memory comprising at least one program module, wherein the payment enabler computer server is operable to execute the at least one program module for:
        receiving at the payment enabler computer server notification of an amount owed from a first business to a second business per an agreed upon transaction;
        enabling a remote user employee of the first business to register other employees of the first business to interact with the payment enabler computer server on behalf of the first business;
        verifying that a first employee of the first business has been granted a privilege to authorize payment of the amount owed on behalf of the first business;
        receiving from a remote computer of the first employee of the first business a command to pay the second business the amount owed;
        ordering a first transfer of the amount owed from a bank account of the first business into a first intermediary bank account through direct debit of the bank account of the first business; and
        ordering a second transfer of the amount owed from a second intermediary bank account to a bank account of the second business via a direct deposit into the bank account of the second business.

18. The system of claim 17, wherein the payment enabler computer server is further operable to execute the at least one program module for enabling the remote super user employee of the first business to specify privileges that the server should grant each of the other employees to act on behalf of the first business.

19. The system of claim 18, wherein the privileges are selected from the group consisting of a privilege to provide the server with the transaction details, a privilege to confirm the transaction details without binding the first business to complete payment using the server, the privilege to authorize payment on behalf of the first business up to a specified limit, and a privilege to inquire about a transaction status.

20. The system of claim 18, wherein the other employees of the first business comprise the first employee of the first business.

21. The system of claim 17, wherein the first intermediary bank account comprises the second intermediary bank account.

* * * * *